United States Patent
Jeong (10) Patent No.: US 8,416,470 B2
(45) Date of Patent: Apr. 9, 2013

(54) METHOD OF AND APPARATUS FOR REMOVING SHOW-THROUGH FROM SCANNED IMAGE

(75) Inventor: Young-hoon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 12/649,831

(22) Filed: Dec. 30, 2009

(65) Prior Publication Data

US 2010/0195165 A1  Aug. 5, 2010

(30) Foreign Application Priority Data

Feb. 5, 2009 (KR) .......................... 10-2009-009350

(51) Int. Cl.
*H04N 1/04* (2006.01)
*H04N 1/409* (2006.01)
*H04N 1/46* (2006.01)
*G03G 15/00* (2006.01)
*G06K 9/40* (2006.01)

(52) U.S. Cl.
USPC ......... 358/474; 358/3.26; 358/3.27; 358/475; 358/497; 358/532; 399/364; 382/254

(58) Field of Classification Search .................. 358/474, 358/3.26, 3.27, 475, 497, 532; 399/364; 382/254; 355/67
See application file for complete search history.

(56) References Cited

U.S. PATENT DOCUMENTS

2006/0263126 A1* 11/2006 Heydinger et al. ........... 399/364

FOREIGN PATENT DOCUMENTS

KR  10-2008-0090017 A  10/2008

* cited by examiner

*Primary Examiner* — Charlotte M Baker
*Assistant Examiner* — Rury Grisham
(74) *Attorney, Agent, or Firm* — Sughrue Mion, PLLC (57) ABSTRACT

Provided are a method and apparatus for removing show-through from a scanned image. The method includes scanning at least one line in a medium at a first intensity in a first scanning operation; scanning the at least one line in the scanning medium at a second intensity different from the first intensity, in a second scanning operation; and removing show-through from an image obtained during the first scanning operation based on a difference in a show-through effect between images obtained during the first and second scanning operations.

19 Claims, 8 Drawing Sheets

METHOD OF AND APPARATUS FOR REMOVING SHOW-THROUGH FROM SCANNED IMAGE

CROSS-REFERENCE TO RELATED PATENT APPLICATION

This application claims priority from Korean Patent Application No. 10-2009-0009350, filed on Feb. 5, 2009, in the Korean Intellectual Property Office, the disclosure of which is incorporated herein in its entirety by reference.

BACKGROUND OF THE INVENTION

1. Field of the Invention

Methods and apparatuses consistent with the present invention relate to an image scanner, and more particularly, to a method and apparatus capable of effectively removing or suppressing show-through that may occur during scanning of a medium using an image scanner.

2. Description of the Related Art

An image scanner (hereinafter, referred to as 'scanner') may optically scan a medium, such as a document, a drawing, a photograph, or a film, obtain image data from light reflected by or transmitted through the medium using an image sensor, and process the image data in various ways.

In general, scanners may be classified into a complementary-metal-oxide-semiconductor (CMOS) image sensor (CIS) type or a charge-coupled device (CCD) type.

For the CIS type, red, green and blue (RGB) light may be irradiated onto a medium disposed on a glass plate in a predetermined temporal sequence, reflected by the medium, and then detected by photo-transistors. For the CCD-type, light irradiated from a lamp may be reflected by the glass plate with the medium, passed through an aperture, reflected by a mirror and then detected by a CCD linear array. The CIS and CCD types may be used as scanners or multifunctional apparatuses.

Meanwhile, when a thin or diaphanous medium, such as newspapers or printing paper, is scanned, not only intended data on a front surface of the medium but also unintended data on a rear surface thereof may be obtained during a scanning operation. This phenomenon is called 'show-through'.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method and apparatus for effectively removing show-through using an inexpensive single sensor and a small-capacity memory device, and a computer-readable medium having embodied thereon a computer program for executing the method.

According to an aspect of the present invention, there is provided a method of removing show-through from a scanned image, the method including: scanning at least one line in a medium at a first intensity in a first scanning operation; scanning the at least one line in the scanning medium at a second intensity different from the first intensity in a second scanning operation; and removing show-through from an image obtained during the first scanning operation based on a difference in a show-through effect between images obtained during the first and second scanning operations. The first and second scanning operations may be performed using a single scanning sensor.

According to an aspect of the present invention, the first and second scanning operations may be sequentially performed on a single line of the medium without moving forwardly the single scanning sensor. Herein, the single scanning sensor may move forwardly to scan another at least two lines of the medium next to the single line after both of the first and second scanning operations are performed on the single line.

According to an aspect of the present invention, the first and second scanning operations may be performed on at least two adjacent lines of the medium. Herein, the second scanning operation may be performed on the at least two adjacent lines of the medium after the first scanning operation is performed on the at least two adjacent lines of the medium. Also, after the second scanning operation, the single scanning sensor may move forwardly to scan a line next to the at least two adjacent lines of the medium. In this case, the first scanning operation may be forward scanning, and the second scanning operation may be forward or backward scanning.

A difference between the first intensity and the second intensity may be obtained using light that is irradiated from a light source and reflected by a rotatable polyhedron having a plurality of planes. Herein, at least two of the planes have different plane reflectances.

The rotatable polyhedron may be one selected from the group consisting of an elliptical column, a trigonal prism, a tetragonal pillar, a pentagonal pillar, a hexagonal pillar, and a circular cylinder.

According to an aspect of the present invention, a difference between the first intensity and the second intensity may be obtained by varying an input voltage applied to a light source to at least two levels.

According to another aspect of the present invention, a difference between the first intensity and the second intensity may be obtained by varying the light transmittance of an liquid-crystal display (LCD) panel located between a light source and the medium, to at least two levels.

The second intensity may be adjusted to be lower than the first intensity such that the show-through is more suppressed in the image obtained during the second scanning operation than in the image obtained during the first scanning operation.

The second intensity may be adjusted on the basis of an image scanned using predetermined printed patterns formed on a scanner upper plate, whose brightness is varied according to a direction in which the medium moves.

According to another aspect of the present invention, there is provided an apparatus of removing show-through from a scanned image, the apparatus including: a scanning unit configured to perform a first scanning operation on at least one line in a medium with a first intensity and perform a second scanning operation on the at least one line with a second intensity different from the first intensity; and a control unit configured to remove show-through from an image obtained during the first scanning operation based on a difference in a show-through effect between images obtained during the first and second scanning operations.

The scanning unit may include a single scanning sensor configured to perform the first and second scanning operations.

According to an aspect of the present invention, the single scanning sensor may sequentially perform the first and second scanning operations on a single line of the medium without any forward movement. Herein, the single scanning sensor may move forwardly to scan another line next to the single line after both of the first and second scanning operations are performed on the single line.

According to another aspect of the present invention, the single scanning sensor may sequentially perform the first and second scanning operations on at least two adjacent lines of the medium. Herein, the second scanning operation may be performed on the at least two adjacent lines of the medium after the first scanning operation is performed on the at least two adjacent lines of the medium. Also, after the second scanning operation, the single scanning sensor may move forwardly to scan a line next to the at least two adjacent lines of the medium. In this case, the first scanning operation may be forward scanning, and the second scanning operation may be forward or backward scanning.

The scanning unit may further include a rotatable polyhedron having a plurality of planes. At least two of the planes may have different reflectances. The rotatable polyhedron may reflect light incident from a light source to generate light of the first intensity and light of the second intensity.

The rotatable polyhedron may be one selected from the group consisting of an elliptical column, a trigonal prism, a tetragonal pillar, a pentagonal pillar, a hexagonal pillar, and a circular cylinder.

According to an aspect of the present invention, the scanning unit may vary an input voltage applied to a light source to at least two levels to generate light of the first intensity and light of the second intensity.

According to another aspect of the present invention, the scanning unit may vary the light transmittance of an LCD panel located between a light source and the medium, to at least two levels to generate light of the first intensity and light of the second intensity.

The scanning unit may adjust the second intensity to be lower than the first intensity such that the show-through is more suppressed in the image obtained during the second scanning operation than in the image obtained during the first scanning operation.

The scanning unit may adjust the second intensity on the basis of an image scanned using predetermined printed patterns formed on a scanner upper plate, whose brightness is varied according to a direction in which the medium moves.

According to another aspect of the present invention, there is provided a computer-readable storage medium having embodied thereon a computer program for executing the above-described method of removing show-through from the scanned image.

BRIEF DESCRIPTION OF THE DRAWINGS

The above and/or other features of the present invention will become more apparent by describing in detail exemplary embodiments thereof with reference to the attached drawings in which.

DETAILED DESCRIPTION OF THE INVENTION

Figure 1:
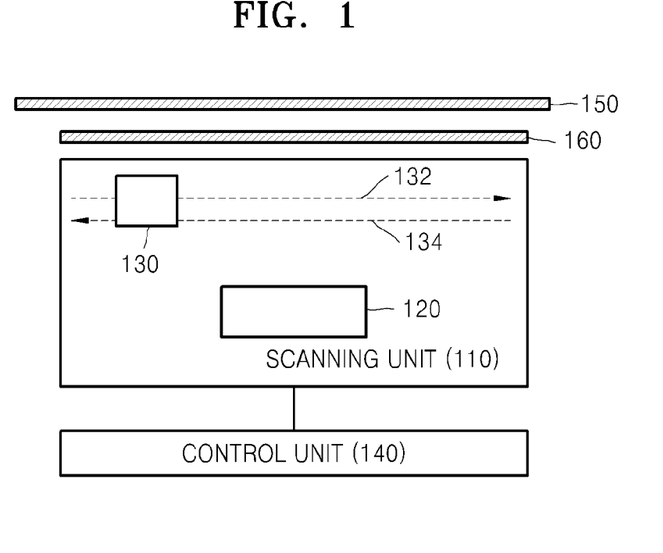
FIG. 1 is a drawing of an apparatus for removing show-through from a scanned image according to an exemplary embodiment of the present invention.

FIG. 1 is a drawing of an apparatus for removing show-through from a scanned image (hereinafter, referred to as 'show-through removing apparatus') according to an exemplary embodiment of the present invention.

Referring to FIG. 1, the show-through removing apparatus serves to remove show-through by scanning at least one line in a medium 160 at two different intensities and may be exemplarily embodied in various image sensing apparatuses, such as scanners and multifunctional apparatuses. The show-through removing apparatus may include a scanning unit 110 and a control unit 140.

The scanning unit 110 may scan at least one line in the medium 160 mounted on a glass plate (not shown) of a scanner at two intensities. To do this, the scanning unit 110 may include an optical driver 120 and a scanning sensor 130.

The optical driver 120 may include a light source to irradiate light at a predetermined intensity onto a region of the medium 160 that will be scanned. The control unit 140 may control an operation of the optical driver 120. Light irradiated from the optical driver 120 may be reflected by the medium 160 disposed between the glass plate and an upper plate 150, and detected by the scanning sensor 130.

The scanning sensor 130 may sense light reflected by the medium 160 and obtain two-dimensional image data. The scanning sensor 130, for example, a charge-coupled-device (CCD) sensor or a complementary-metal-oxide-semiconductor (CMOS)-image-sensor (CIS) sensor, may include photosensitive pixels disposed along a single line. The scanning sensor 130 may move along a scanning direction parallel to a top surface of the medium 160 to obtain the image data. That is, during a scanning operation, the scanning sensor 130 may move forwardly from a scanning start line to a scanning end line (refer to 132 in FIG. 1) or move backwardly from the scanning end line to the scanning start line (refer to 134 in FIG. 1). Hereinafter, the former and the latter will be called a forward scanning operation and a backward scanning operation, respectively.

During the forward scanning operation, the scanning sensor 130 may move along the direction parallel to the top surface of the medium 160 to obtain two-dimensional image data. Under the circumstance that light having suitable brightness is provided, the scanning sensor 130 may obtain an image having a predetermined resolution within a predetermined region while moving along a single direction 132, and transmit the obtained image to a memory or another module. According to a general scanning method, when a forward scanning operation is finished, the scanning unit 110 including the light source may be turned off, and the scanning sensor 130 may return quickly to a scanning start position.

During the backward scanning operation, which may follow the forward scanning operation, while moving along a direction opposite to the forward scanning operation, the scanning sensor 130 may obtain two-dimensional image data from the medium 160 mounted on the glass plate. Preferably, though not necessarily, the forward and backward scanning operations may be sequentially performed, and the medium 160 should be fixed during the backward scanning operation.

The control unit 140 may control an overall operation of the scanning unit 110 and remove show-through from the obtained image using a difference in degree of show-through between two or more images that are taken by the scanning sensor 130. The show-through may be removed in various ways. A detailed exemplary embodiment thereof will be described in detail later.

Hereinafter, the reason for show-through occurring during a scanning operation of an image scanner and the dependence of show-through on intensity (of light) will be explained.

A dye, such as ink and toner, may be absorbed and solidified into both sides of a thin textile medium by means of spray or coating. Light incident onto the medium may be absorbed in, scattered by, reflected by or transmitted through the medium, depending on the type, thickness, or transparency of the medium or the presence of impurities. However, in the case that a medium is stained by a dye, such as ink or toner, light incident into the medium may be reflected by the dye and the reflectance of the light may be dependent on intensity thereof. If sufficiently high intensity light is incident, the incident light would be reflected by not only a dye contained in a front surface of the medium, which is a target surface, but also a dye contained in a rear surface thereof. As a result, the image scanner may detect such unintended reflection light, thus resulting in show-through.

In contrast, if sufficiently low intensity light is incident, light incident onto a dye contained in the surface opposite the target surface of the medium cannot be transmitted through the medium, and thus show-through may be prevented or reduced. However, this scanning method may lead to a dim image so that a user cannot obtain desired image quality. Accordingly, a backward scanning method to remove show-through without this problem may be applied.

Figure 2A:
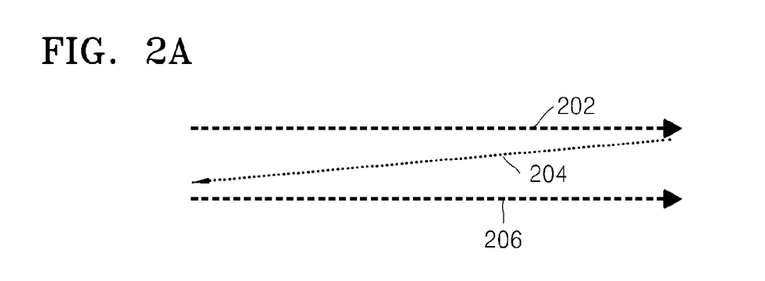
FIGS. 2A through 2D are diagrams of an operation of a scanning unit of the apparatus for removing show-through of FIG. 1, according to an exemplary embodiment of the present invention.

FIGS. 2A through 2D are diagrams of an operation of the scanning unit 110 of FIG. 1, according to an exemplary embodiment of the present invention;

Referring to FIG. 2A, the scanning unit 110 may scan forwardly from the scanning start line to the scanning end line (refer to 202), move backwardly to the scanning start line under a condition that the light source is turned off (refer to 204), and re-scan forwardly from the scanning start line to the scanning end line (refer to 206). In a first forward scanning operation 202, light irradiated by the light source may be at the same intensity as light of a typical scanner used for scanning the medium 160. By comparison, in a second forward scanning operation 206, the intensity of light irradiated by the light source may be adjusted to be different than in the first forward scanning operation 202, for example, lower than in the first forward scanning operation 202. The exemplary embodiment of FIG. 2A may provide an advantage in that show-through may be removed by an inexpensive single sensor without repeating forward scanning.

Figure 2B:
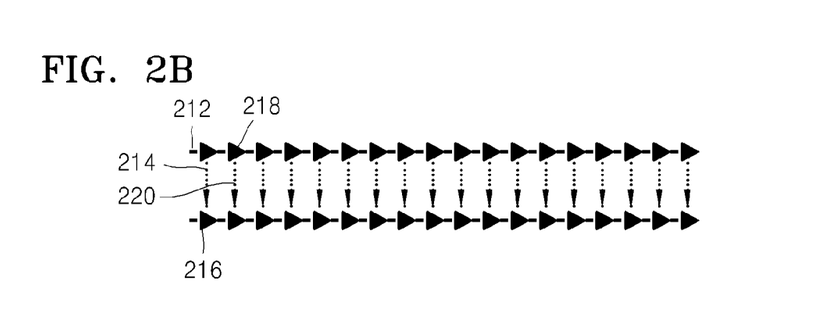

Referring to FIG. 2B, the scanning unit 110 may scan the scanning start line (hereinafter, referred to as 'first line') under a condition of a first intensity (refer to 212). Here, the first intensity means a predetermined intensity condition selected to scan the medium 160, for example, an intensity equivalent to a typical intensity of a conventional scanner. Next, without any forward or backward movement (refer to 214), the scanning unit 110 may scan the first line under a condition of a second intensity different from the first intensity (refer to 216). Here, the second intensity means an intensity condition selected to remove show-through from an obtained image of the medium 160, for instance, an intensity lower than the first intensity. Similarly, the scanning unit 110 may scan a line next to the first line (hereinafter, referred to as 'second line') at a first intensity (refer to 218), and then scan the second line at a second intensity different from the first intensity without any forward or backward movement. The above-described way may be used to scan all lines in the medium 160 at a predetermined intensity and an intensity different from the predetermined intensity.

The embodiment of FIG. 2B may provide an advantage in that a storage capacity required for a subsequent operation wherein show-through is removed may be considerably reduced, in addition to the advantage provided by the exemplary embodiment of FIG. 2A. In order to perform the show-through removing process, both a firstly scanned image and a secondly scanned image should be stored in a memory device. For the case of FIG. 2A, a large-capacity memory device may be needed to store firstly and secondly scanned images obtained for all lines in the medium 160.

In contrast, for the case of FIG. 2B, it is only necessary to store firstly scanned images for a single line in the medium 160 so as to remove show-through. Accordingly, a large storage capacity for storing the scanned images obtained for all lines in the medium 160 is not required.

Figure 2C:
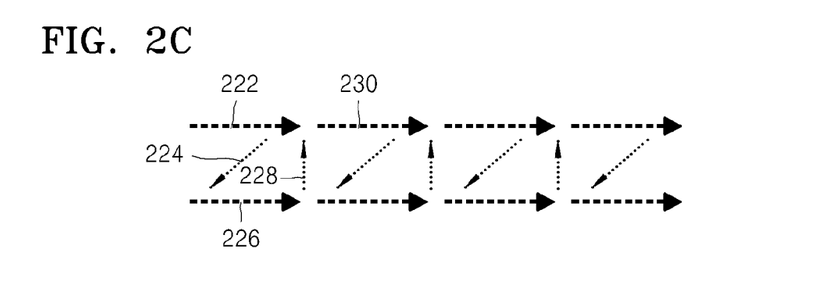

Referring to FIG. 2C, the scanning unit 110 may scan forwardly at least two adjacent lines (hereinafter, referred to as 'first line group'), which include the scanning start line, under a condition of a first intensity (refer to 222). Here, the first intensity is the same as described above with reference to FIG. 2B. Next, the scanning unit 110 may move backwardly to the scanning start line under a condition that the light source is turned off (refer to 224). Thereafter, the scanning unit 110 may scan forwardly again the first line group under a condition of a second intensity different from the first intensity (refer to 226). Here, the second intensity is the same as described above with reference to FIG. 2B. Similarly, the scanning unit 110 may scan forwardly a line group (hereinafter, referred to as 'second line group') next to the first line group under a condition of a first intensity (refer to 230), move backwardly, and re-scan forwardly the second line group at a second intensity. The above-described way may be used to scan all lines in the medium 160 at a predetermined intensity and an intensity different from the predetermined intensity.

Figure 2D:
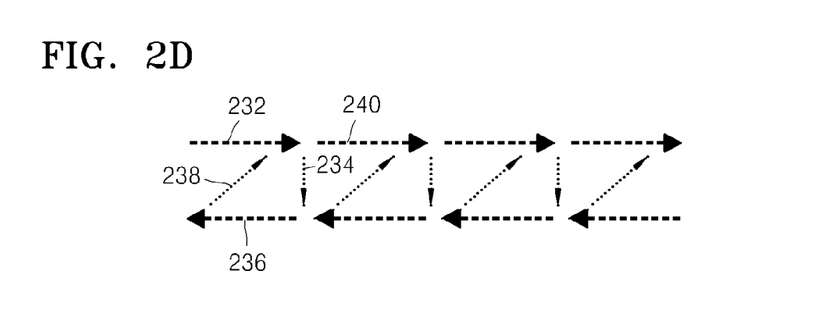

Referring to FIG. 2D, the scanning unit 110 may scan forwardly a first line group including the scanning start line under a condition of a first intensity (refer to 232). Here, the first intensity is the same as described above with reference to FIG. 2B. Next, the scanning unit 110 may scan backwardly the first line group from a position 234 where a forward scanning operation 232 is finished, under a condition of a second intensity different from the first intensity (refer to 236). Here, the second intensity is the same as described above with reference to FIG. 2B. Thereafter, the scanning unit 110 may move forwardly to the position 234 under a condition that the light source is turned off (refer to 238). The above-described way may be used to scan all lines in the medium 160 at a predetermined intensity and an intensity different from the predetermined intensity.

Figure 3:
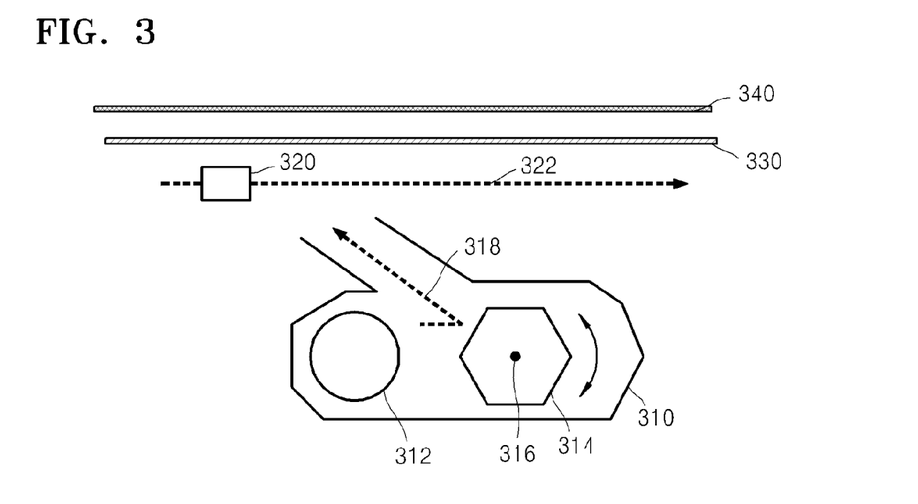
FIG. 3 is a diagram of a structure of an optical driver for a show-through removing apparatus according to an exemplary embodiment of the present invention.

FIG. 3 is a diagram of a structure of an optical driver for a show-through removing apparatus according to an exemplary embodiment of the present invention. An optical driver 310 of FIG. 3 may be applied to, for example, a CCD-type scanner.

Referring to FIG. 3, the optical driver 310 may include a light source 312 and a rotatable polyhedron 314. The optical driver 310 may be configured to irradiate light at a predetermined first intensity or a second intensity different from the first intensity onto a line of a medium 330 that will be scanned.

Figure 4A:
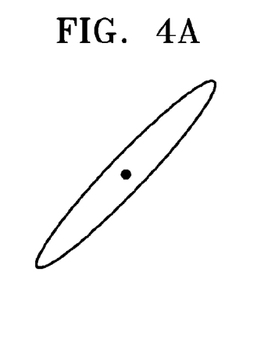
FIGS. 4A through 4D are drawings of examples of a rotatable polyhedron of the optical driver of FIG. 3, according to exemplary embodiments of the present invention.
Figure 4B:
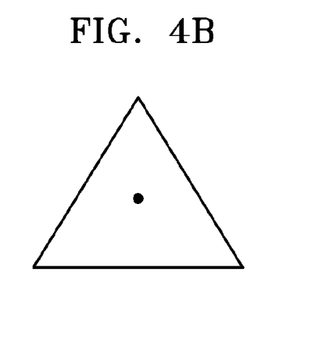
Figure 4C:
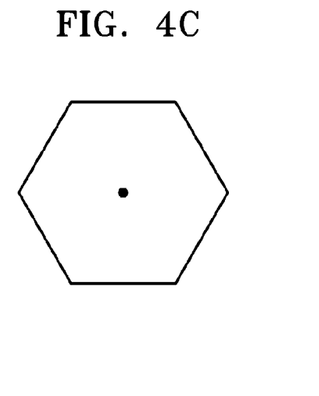
Figure 4D:
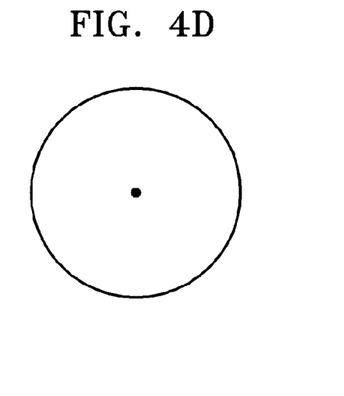

To do this, the rotatable polyhedron 314 may reflect light transmitted from the light source 312 and transmit the reflected light toward the medium 330 along an optical path 318. The rotatable polyhedron 314 may have one of shapes including an elliptical column (see FIG. 4A), a trigonal prism (see FIG. 4B), a tetragonal pillar, a pentagonal pillar, a hexagonal pillar (see FIG. 4C), and a circular cylinder (see FIG. 4D). Also, the rotatable polyhedron 314 may have a rotating axis 316 located on the center thereof. The rotatable polyhedron 314 may rotate at a speed that depends on a scanning speed of the medium 330 and has facets whose reflectance differs from one another.

Light irradiated from the light source 312 may be reflected by the facets or surfaces of the rotatable polyhedron 314, which have different reflectances. For instance, the elliptical column of FIG. 4A may have a first surface having a high reflectance and a second surface having a low reflectance. Here, we assume that the elliptical column may be divided by two surface (that is, the first surface and the second surface) based on a major axis of the ellipse. Accordingly, the optical driver 310 may irradiate light at two different intensities onto the medium 330. And, the trigonal prism of FIG. 4B may have a first facet having a high reflectance, a second facet having an intermediate reflectance, and a third facet having a low reflectance. In this case, the optical driver 310 may irradiate light at three different intensities onto the medium 330. That is, as explained here, if the facets or surfaces of the rotatable polyhedron 314 have different reflectances, an intensity of light irradiated onto the medium 330 may be adjusted without controlling the brightness of the light source itself. Polyhedrons other than the elliptical column and the trigonal prism may be also configured to implement such a function of the rotatable polyhedron 314.

According to these exemplary embodiments, even if a single line is scanned in each scanning operation as shown in FIG. 2B the brightness of the light source during the entire scanning process may not be required to be adjusted. That is, light may be irradiated at least two different intensities on a single line of the medium 330 by controlling the rotating speed of the rotatable polyhedron 314.

A scanning unit 320, a medium 330, and a scanner upper plate 340 are configured in a similar way to that described with reference to FIG. 1, and thus a description thereof will be omitted here for brevity.

Figure 5:
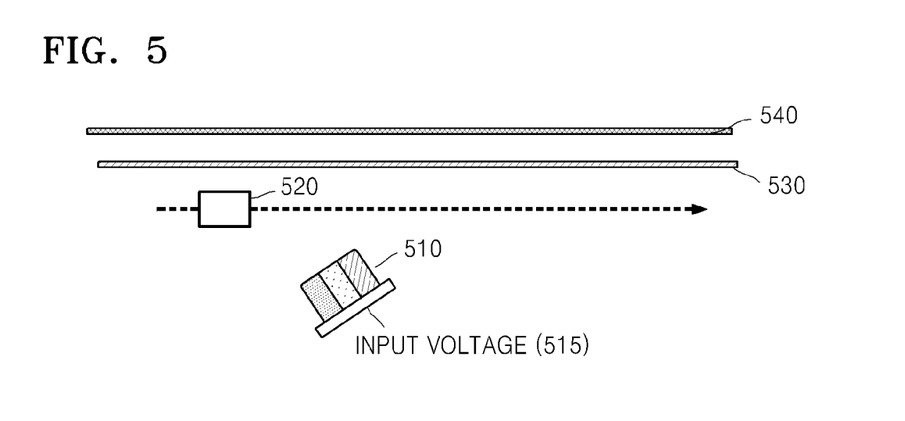
FIG. 5 is a diagram of a structure of an optical driver for a show-through removing apparatus according to another exemplary embodiment of the present invention.

FIG. 5 is a diagram of a structure of an optical driver for a show-through removing apparatus according to another exemplary embodiment of the present invention. An optical driver 510 of FIG. 5 may be applied to, for example, a CIS-type scanner.

Referring to FIG. 5, the optical driver 510 may be configured to irradiate red, green, and blue (RGB) light at a predetermined first intensity or a second intensity different from the first intensity onto a line of a medium 530 that will be scanned. The intensity of RGB light may be controlled by adjusting an input voltage 515 applied to the optical driver 510, and the input voltage 515 may be adjusted by the control unit 140.

A method of adjusting the input voltage 515 using the control unit 140 according to an exemplary embodiment will now be described with reference to FIGS. 6A and 6B.

Figure 6A:
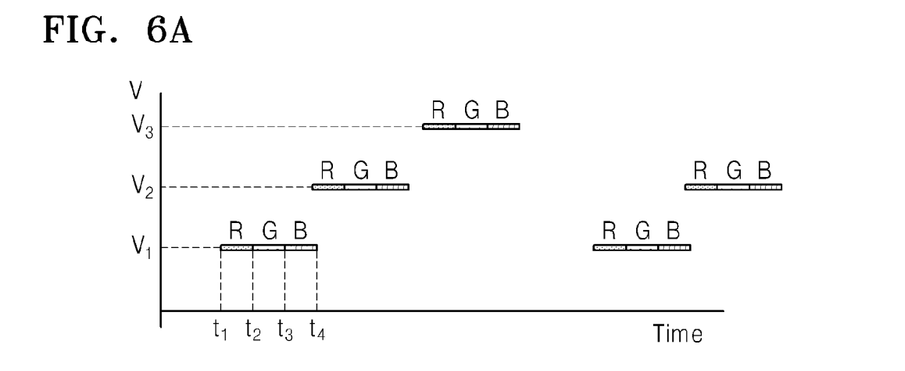
FIGS. 6A and 6B are timing diagrams illustrating a method of adjusting an input voltage of FIG. 5.

Referring to FIG. 6A, the control unit 140 may apply the input voltage 515 at a voltage $V_1$ to the optical driver 510 for a time period $t_1 \leq t \leq t_4$. Specifically, the control unit 140 may apply the input voltage 515 at the voltage $V_1$ to a red (R) light source for a time period $t_1 \leq t \leq t_2$, apply the input voltage 515 at the voltage $V_1$ to a green (G) light source for a time period $t_2 \leq t \leq t_3$, and apply the input voltage 515 at the voltage $V_1$ to a blue (B) light source for a time period $t_3 \leq t \leq t_4$. Subsequently, the control unit 140 may sequentially apply the input voltage 515 at a voltage $V_2$ to the R, G, and B light sources and sequentially apply the input voltage 515 at a voltage $V_3$ to the R, G, and B light sources.

Figure 6B:
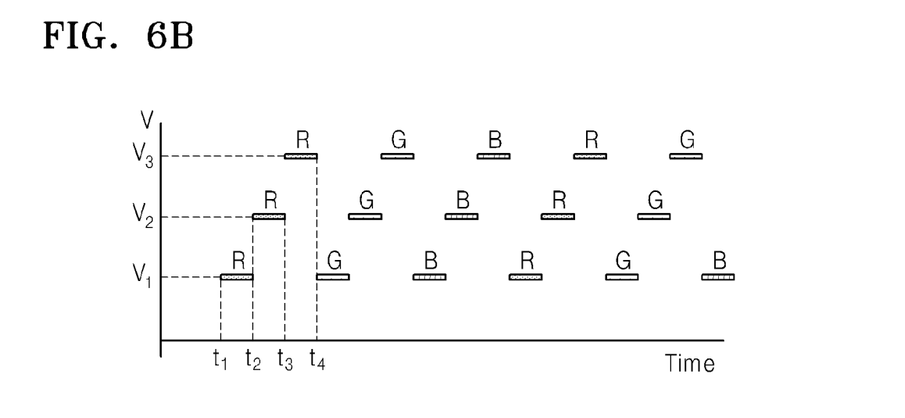

Referring to FIG. 6B, the control unit 140 may apply the input voltage 515 at the voltage $V_1$ to the R light source for a time period $t_1 \leq t \leq t_2$, apply the input voltage 515 at the voltage $V_2$ to the R light source for a time period $t_2 \leq t \leq t_3$, and apply the input voltage 515 at the voltage $V_3$ to the R light source for a time period $t_3 \leq t \leq t_4$. Subsequently, the control unit 140 may sequentially apply the input voltage 515 at the voltages $V_1$, $V_2$ and $V_3$ to the G light source and sequentially apply the input voltage 515 at the voltages $V_1$, $V_2$ and $V_3$ to the B light source.

In the exemplary embodiments described above with reference to FIGS. 6A and 6B, light at three different intensities is irradiated onto the medium 530. That is, the input voltage at the three different voltages $V_1$, $V_2$, and $V_3$ are applied to the optical driver 510. However, the present invention is not limited to the above-described exemplary embodiments in which light at three different intensities is used.

Figure 7:
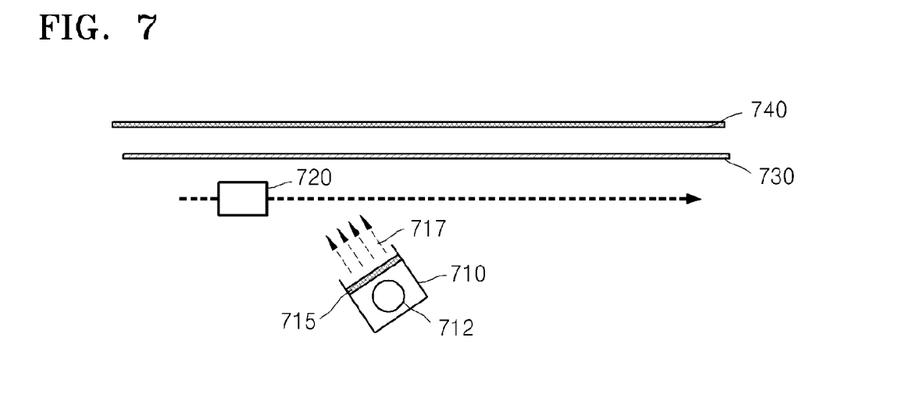
FIG. 7 is a diagram of a structure of an optical driver for a show-through removing apparatus according to another exemplary embodiment of the present invention.

FIG. 7 is a diagram of a structure of an optical driver 710 for a show-through removing apparatus according to another exemplary embodiment of the present invention. The optical driver 710 of FIG. 7 may be applied to, for example, a CCD-type or CIS-type scanner.

Referring to FIG. 7, the optical driver 710 may be configured to irradiate light at a predetermined first intensity or a second intensity different from the first intensity onto a line of a medium 730 that will be scanned. To do this, the optical driver 710 may include a liquid-crystal display (LCD) panel 715 disposed between a light source 712 and the medium 730.

The control unit 140 may control transmittance of light transmitted through the LCD panel 715 so that the intensity of light irradiated onto the medium 730 can be varied to at least two levels.

FIGS. 8A through 8D are drawings of the LCD panel 715 of FIG. 7, according to exemplary embodiments of the present invention.

Figure 8A:
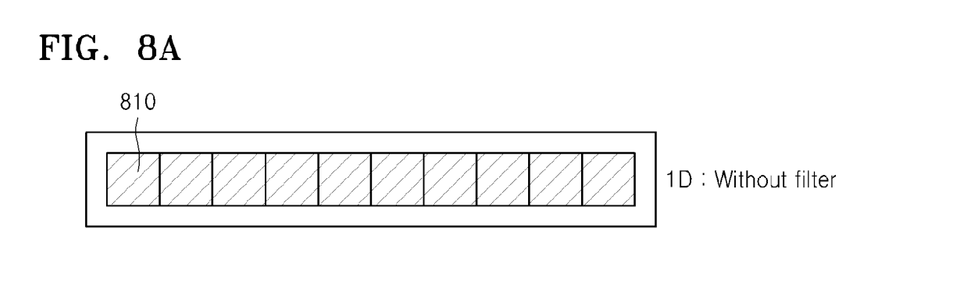
FIGS. 8A through 8D are drawings of a liquid-crystal display (LCD) panel of the optical driver of FIG. 7, according to exemplary embodiments of the present invention.
Figure 8B:
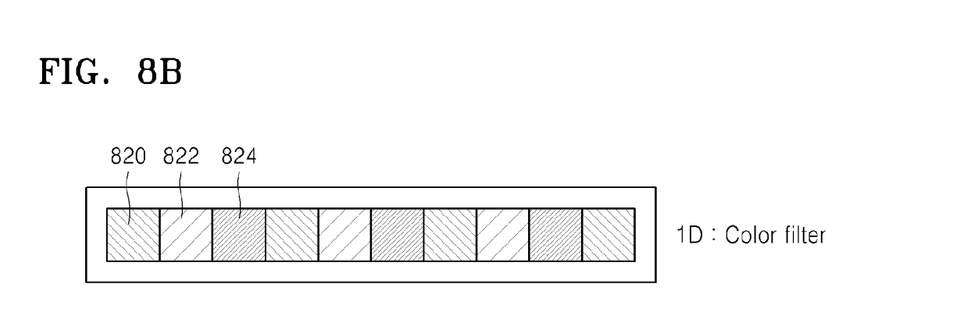
Figure 8C:
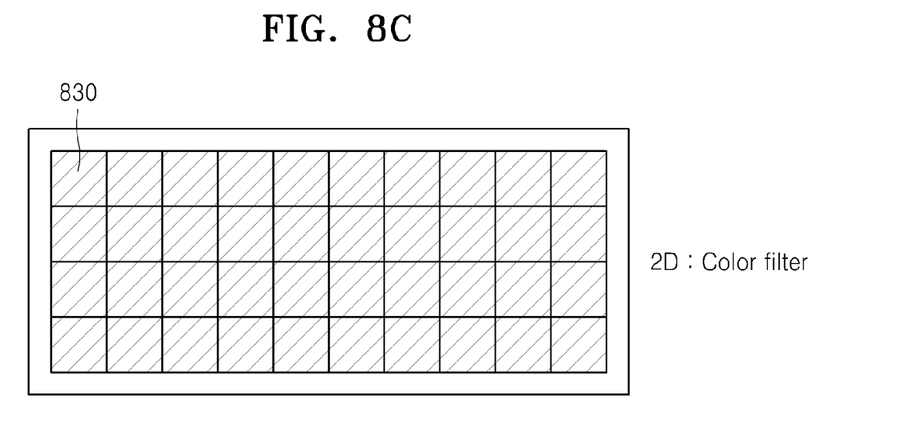
Figure 8D:
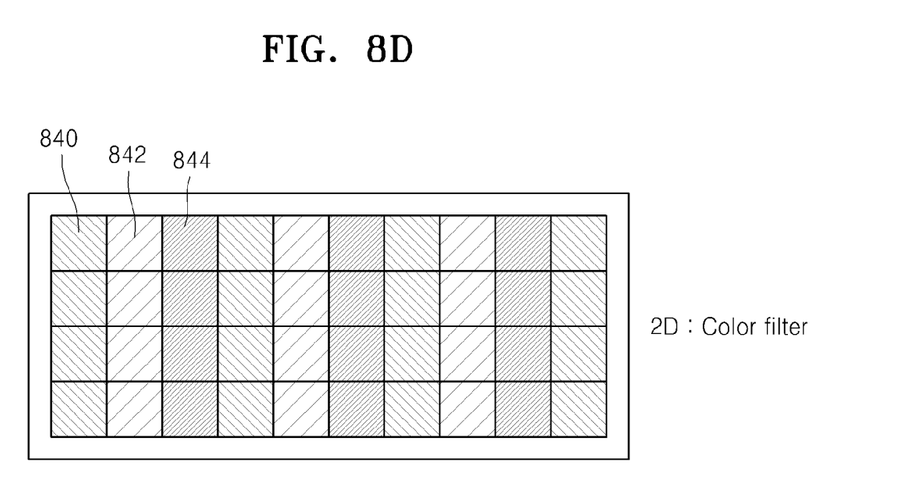

FIGS. 8A and 8C are related to exemplary embodiments of LCD panels without color filters, while FIGS. 8B and 8D are related to exemplary embodiments of LCD panels with color filters. And, FIGS. 8A and 8B are related to exemplary embodiments of LCD panels whose filters are arranged one-dimensionally, and FIGS. 8C and 8D are related to exemplary embodiments of LCD panel whose filters are arranged two-dimensionally.

The control unit 140 may control the light transmittance of each of pixels 810, 820, 822, 824, 830, 840, 842, and 844 of the LCD panel. That is, the light transmittance of each pixel of the LCD panel may be increased in order to irradiate high intensity light onto the medium 730, while the light transmittance of each pixel of the LCD panel may be decreased in order to irradiate low intensity light onto the medium 730.

Hereinafter, a process of removing show-through using a difference in a show-through effect between images obtained using two or more intensities will be described. The show-through may be removed in various ways. For example, forward or first scanning may be performed under a condition of a sufficiently high intensity, and thus show-through may occur severely on a rear side of a medium. In contrast, backward or second scanning may be performed under a condition of a lower intensity compared with the forward or first scanning. As a result, a show-through effect may be relieved relatively, but brightness of a scanned image may be generally low.

Accordingly, an image obtained by the backward or second scanning may be used to acquire an outline of an intended image on a front surface of a medium, and the acquired outline may be used to remove show-through noise from the image obtained by the forward or first scanning.

Meanwhile, the above-described method is provided as an exemplary embodiment, and various other methods may be applied to remove the show-through noise and effectively obtain the intended image on the front surface of the medium.

Figure 9A:
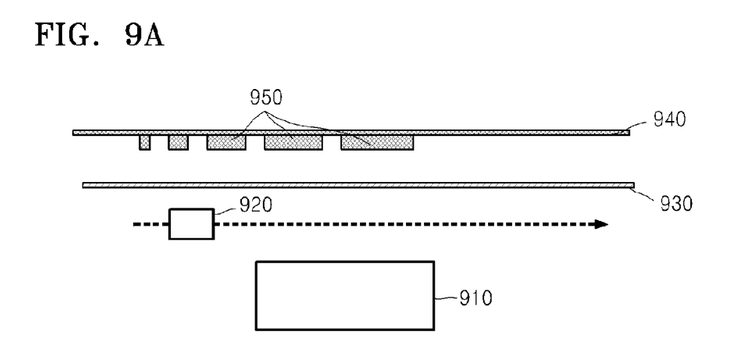
FIGS. 9A and 9B are diagrams illustrating a method of determining a parameter to adjust light intensity according to an exemplary embodiment of the present invention.
Figure 9B:
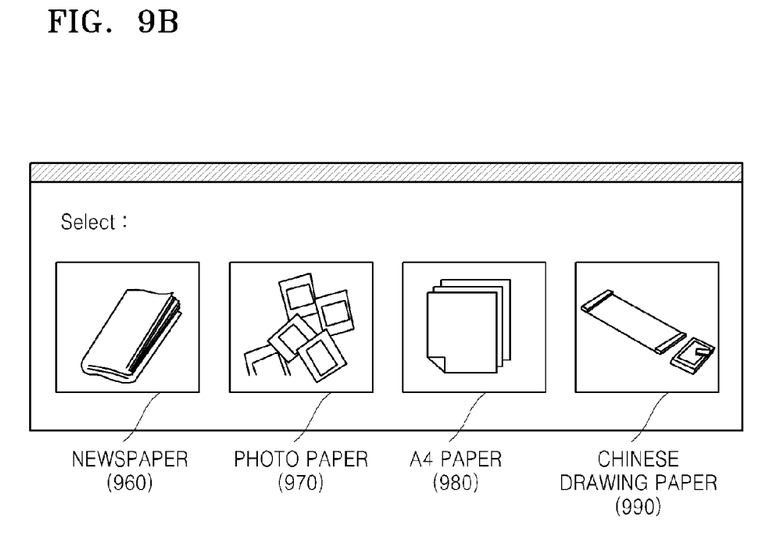

A method of controlling the intensity of light irradiated on lines of the medium 160 will now be described with reference to FIGS. 9A and 9B.

To begin with, the scanning unit 110 may scan forwardly the medium 160 or firstly scan one line thereof. A scanned image may be stored in a memory device. Thereafter, a value for estimating a degree of a show-through effect, that is, a parameter L of the medium 160, may be determined. Here, the parameter L may be a number selected out of a range from 0 to 9 according to the degree of show-through. For instance, a value 9 may be given as the parameter L for a diaphanous medium such as a newspaper, while a value 0 may be given as the parameter L for an opaque medium such as a glossy paper.

The parameter L may be determined in various ways. For instance, the parameter L may be fixed. Alternatively, referring to FIG. 9A, the parameter L may be determined by measuring intensity of light that is irradiated from an optical driver 910 and is reflected (or passed through) by a scanner upper plate 940, in a scanning sensor 920. Here, the scanner upper plate 940 has predetermined printed patterns and each of the printed patterns may have various brightness according to a direction in which the medium moves.

In another case, a user may arbitrarily input the parameter L based on image data provided for a preview. Or, as shown in FIG. 9B, a user may choose the type of medium (e.g., newspaper 960, photo paper 970, A4 paper 980, and Chinese drawing paper 990) at a user interface of a scanner so that a specific value corresponding to the chosen type may be given as the parameter L.

The scanning unit 110 may be adjusted to emit light at a specific intensity according to the determined parameter L and then re-scan the medium 160. For instance, the light intensity in re-scanning the medium 160 may be adjusted based on the image scanned using printed patterns formed on a scanner upper plate. In addition, the resolution of the scanning unit 110 or the characteristics of a sensor therein may be adjusted according to the determined parameter L.

Figure 10:
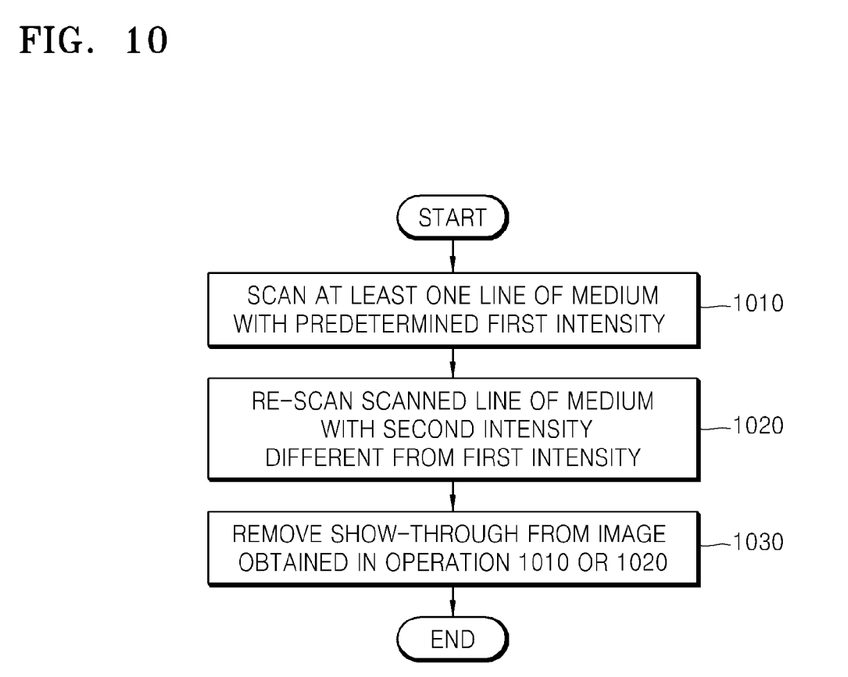
FIG. 10 is a flowchart illustrating a method of removing show-through from a scanned image according to an exemplary embodiment of the present invention.

FIG. 10 is a flowchart illustrating a method of removing show-through from a scanned image according to an exemplary embodiment of the present invention.

Referring to FIG. 10, the scanning unit 110 may scan at least one line of a medium at a predetermined first intensity (operation 1010) and re-scan the scanned line of the medium at a second intensity that is different from the first intensity (operation 1020).

Thereafter, based on a difference in a show-through effect between images obtained in operations 1010 and 1020, show-through may be removed from the image obtained in operation 1010 or 1020 (operation 1030).

According to the exemplary embodiments of the present invention, show-through may be effectively removed using an inexpensive single sensor and a small-capacity memory device.

Furthermore, it is unnecessary to store all initial images obtained from all lines of a medium in a memory device because show-through can be removed by scanning only one or a few lines of the medium.

While the present invention has been particularly shown and described with reference to exemplary embodiments thereof, it will be understood by those of ordinary skill in the art that various changes in form and details may be made therein without departing from the spirit and scope of the present invention as defined by the following claims. Also, a system according to the present invention may be realized as a computer-readable code in a computer-readable medium.

In addition, the computer-readable medium includes all types of mediums capable of storing computer-readable data. For example, the computer-readable medium may be one of a read-only memory (ROM), a random access memory (RAM), a compact disk ROM (CD-ROM), a magnetic tape, a floppy disk, and an optical data storage. And the computer-readable medium may be decentralized to computer systems connected through a network, and the computer-readable code may be stored and executed in a dispersive way.

What is claimed is:

1. A method of removing show-through from a scanned image, comprising:
   scanning at least one line in a medium at a first intensity, in a first scanning operation;
   scanning the at least one line in the scanning medium at a second intensity different from the first intensity, in a second scanning operation; and
   removing the show-through from an image obtained in the first scanning operation based on a difference in a show-through effect between images obtained in the first and second scanning operations, in a show-through removing operation, wherein the first and second scanning operations are performed using a single scanning sensor, wherein the first and second scanning operations are sequentially performed on a single line of the medium without moving forwardly the single scanning sensor, and
   wherein the single scanning sensor moves forwardly to scan a single line of the medium next to the single line after both of the first and second scanning operations are performed on the single line.

2. The method of claim 1, wherein a difference between the first intensity and the second intensity is obtained using light that is irradiated from a light source and reflected by a rotatable polyhedron having a plurality of planes, wherein at least two of the planes have different plane reflectances.

3. The method of claim 2, wherein the rotatable polyhedron is one selected from the group consisting of an elliptical column, a trigonal prism, a tetragonal pillar, a pentagonal pillar, a hexagonal pillar, and a circular cylinder.

4. The method of claim 1, wherein a difference between the first intensity and the second intensity is obtained by varying an input voltage applied to a light source to at least two levels.

5. The method of claim 1, wherein a difference between the first intensity and the second intensity is obtained by varying the light transmittance of an liquid crystal display (LCD) panel located between a light source and the medium to at least two levels.

6. The method of claim 1, wherein the second intensity is adjusted to be lower than the first intensity such that the show-through is more suppressed in the image obtained in the second scanning operation than in the image obtained in the first scanning operation.

7. The method of claim 6, wherein the second intensity is adjusted on the basis of an image scanned using printed patterns formed on a scanner upper plate, whose brightness is varied according to a direction in which the medium moves.

8. A method of removing show-through from a scanned image, comprising:
- scanning at least one line in a medium at a first intensity, in a first scanning operation;
- scanning at least one line in a medium at a first intensity, in a first scanning operation;
- scanning the at least one line in the scanning medium at a second intensity different from the first intensity, in a second scanning operation; and
- removing the show-through from an image obtained in the first scanning operation based on a difference in a show-through effect between images obtained in the first and second scanning operations are performed using a single scanning sensor, wherein the first and second scanning operations are sequentially performed on a single line of the medium without moving forwardly the single scanning sensor, and wherein the first and second scanning operations are performed on at least two adjacent lines of the medium,
- wherein the second scanning operation is performed on the at least two adjacent lines of the medium after the first scanning operation is performed on the at least two adjacent lines of the medium, and after the second scanning operation, the single scanning sensor moves forwardly to scan another at least two lines next to the at least two adjacent lines of the medium,
- wherein the first scanning operation is forward scanning, and the second scanning operation is forward or backward scanning.

9. An apparatus of removing show-through from a scanned image, comprising:
- a scanning unit which performs a first scanning operation on at least one line in a medium at a first intensity and performs a second scanning operation on the at least one line at a second intensity different from the first intensity; and
- a control unit which removes show-through from an image obtained during the first scanning operation based on a difference in a show-through effect between images obtained during the first and second scanning operations, wherein the scanning unit comprises a single scanning sensor configured to perform the first and second scanning operations, and
- wherein the single scanning sensor sequentially performs the first and second scanning operations on a single line of the medium without any forward movement,
- wherein the single scanning sensor moves forwardly to scan a line of the medium next to the single line after both of the first and second scanning operations are performed on the single line.

10. The apparatus of claim 9, wherein the scanning unit further comprises a rotatable polyhedron having a plurality of planes, wherein at least two of the planes have different reflectances, and the rotatable polyhedron reflects light incident from a light source to generate light of the first intensity and light of the second intensity.

11. The apparatus of claim 10, wherein the rotatable polyhedron is one selected from the group consisting of an elliptical column, a trigonal prism, a tetragonal pillar, a pentagonal pillar, a hexagonal pillar, and a circular cylinder.

12. The apparatus of claim 9, wherein the scanning unit varies an input voltage applied to a light source to at least two levels to generate light of the first intensity and light of the second intensity.

13. The apparatus of claim 9, wherein the scanning unit varies the light transmittance of an liquid crystal display (LCD) panel located between a light source and the medium, to at least two levels to generate light of the first intensity and light of the second intensity.

14. The apparatus of claim 9, wherein the scanning unit adjusts the second intensity to be lower than the first intensity such that the show-through is more suppressed in the image obtained in the second scanning operation than in the image obtained in the first scanning operation.

15. The apparatus of claim 14, wherein the scanning unit adjusts the second intensity on the basis of an image scanned using printed patterns formed on a scanner upper plate, whose brightness is varied according to a direction in which the medium moves.

16. An apparatus of removing show-through from a scanned image, comprising:
- a scanning unit configured to perform a first scanning operation on at least one line in a medium at a first intensity and perform a second scanning operation on the at least one line at a second intensity different from the first intensity; and
- a control unit configured to remove the show-through from an image obtained in the first scanning operation based on a difference in a show-through effect between images obtained in the first and second scanning operations, wherein the scanning unit comprises a single scanning sensor configured to perform the first and second scanning operations, and wherein the single scanning sensor sequentially performs the first and second scanning operations on at least two adjacent lines of the medium,
- wherein the second scanning operation is performed on the at least two adjacent lines of the medium after the first scanning operation is performed on the at least two adjacent lines of the medium, and after the second scanning operation, the single scanning sensor moves forwardly to scan another at least two lines next to the at least two adjacent lines of the medium,
- wherein the first scanning operation is forward scanning, and the second scanning operation is forward or backward scanning.

17. A non-transitory computer-readable storage medium having embodied thereon a computer program for executing a method of removing show-through from a scanned image, the method comprising:
- scanning at least one line in a medium with a first intensity, in a first scanning operation;
- scanning the at least one line in the scanning medium with a second intensity different from the first intensity, in a second scanning operation; and
- removing show-through from an image obtained during the first scanning operation based on a difference in a show-through effect between images obtained during the first and second scanning operations, in a show-through removing operation, wherein the first and second scanning operations are performed using a single scanning sensor, wherein the first and second scanning operations are sequentially performed on a single line of the medium without moving forwardly the single scanning sensor, and wherein the single scanning sensor moves forwardly to scan a line of the medium next to the single line after both of the first and second scanning operations are performed on the single line.

18. A method of removing show-through from a scanned image, the method comprising:

obtaining a first image by scanning a line of an image using light irradiated at a first brightness level;

obtaining a second image by re-scanning the scanned line of the image using light irradiated at a second brightness level which differs from the first brightness level; and removing show-through from the scanned image using a difference in degree of show-through between the scanned image and the re-scanned image, wherein the scanning the line of the image and the re-scanning the scanned line of the image are performed using a single scanning sensor, wherein the scanning the line of the image and the re-scanning the scanned line of the image are sequentially performed on the line of the image without moving forwardly the single scanning sensor, and wherein the single scanning sensor moves forwardly to scan a line of the image next to the scanned line after both of the scanning the line of the image and the re-scanning the scanned line of the image are performed on the single line.

19. An apparatus for removing show-through from a scanned image, the apparatus comprising:

a scanning unit including:

a scanning sensor which obtains first image information of a first line by a first scanning operation and obtains second image formation of the first line by a re-scanning operation; and an optical driver which irradiates light; and a control unit which controls the optical driver to irradiate light at a first brightness level for the first scanning operation, controls the optical driver to irradiate light at a second brightness level which differs from the first brightness level for the second scanning operation, and removes show-through from the first image information using a difference in degree of show-through between the first image information and the second image information, wherein the first scanning operation and the re-scanning operation are performed using a single scanning sensor, wherein the first scanning operation and the re-scanning operation are sequentially performed on the line of the image without moving forwardly the single scanning sensor, and wherein the single scanning sensor moves forwardly to scan a line of the image next to the first line after both of the first scanning operation and the re-scanning operation are performed on the single line.

* * * * *